(12) United States Patent
Bjoerk et al.

(10) Patent No.: US 8,960,082 B2
(45) Date of Patent: Feb. 24, 2015

(54) APPARATUS FOR STEAMING AND BLENDING FOOD PRODUCTS

(75) Inventors: Anders Joel Bjoerk, Villach (AT); Volkhard Zukale, Klagenfurt (AT)

(73) Assignee: Koninklijke Philips N.V., Eindhoven (NL)

( * ) Notice: Subject to any disclaimer, the term of this patent is extended or adjusted under 35 U.S.C. 154(b) by 1021 days.

(21) Appl. No.: 13/062,523

(22) PCT Filed: Sep. 3, 2009

(86) PCT No.: PCT/IB2009/053847
§ 371 (c)(1),
(2), (4) Date: Apr. 12, 2012

(87) PCT Pub. No.: WO2010/029473
PCT Pub. Date: Mar. 18, 2010

(65) Prior Publication Data
US 2012/0234185 A1  Sep. 20, 2012

(30) Foreign Application Priority Data

Sep. 10, 2008 (EP) .................................. 08164077

(51) Int. Cl.
*A47J 37/12* (2006.01)
*A47J 43/04* (2006.01)
*A47J 43/07* (2006.01)

(52) U.S. Cl.
CPC .......... *A47J 43/0722* (2013.01); *A47J 43/0727* (2013.01)

USPC .................. 99/340; 99/415; 99/510; 241/65; 241/282.1

(58) Field of Classification Search
USPC ........... 99/340, 339, 415, 418, 510, 511, 513; 241/65, 282.1
See application file for complete search history.

(56) References Cited

U.S. PATENT DOCUMENTS

| 6,076,452 | A | * | 6/2000 | Dessuise | .......................... 99/410 |
| 6,505,545 | B2 | * | 1/2003 | Kennedy et al. | .................. 99/331 |
| 7,617,766 | B2 | * | 11/2009 | Tracy et al. | ...................... 99/413 |
| 2004/0146621 | A1 | | 7/2004 | Kennedy et al. | |
| 2005/0173571 | A1 | | 8/2005 | Kim | |
| 2008/0047439 | A1 | | 2/2008 | Tracy et al. | |

FOREIGN PATENT DOCUMENTS

| EP | 1922960 A1 | 5/2008 |
| FR | 2774274 A1 | 8/1999 |

* cited by examiner

*Primary Examiner* — Reginald L Alexander

(57) ABSTRACT

An apparatus for steaming and blending food products comprises a container (2) for receiving the food products, the container having a steam inlet (12) and a steam outlet passage (36). A blade assembly (16) is located in the container for blending the food products. The blade assembly (16) comprising a blade support member (18,22) having at least one blade (20) extending therefrom. The blade support member is located over an opening (14) in the container. The steam outlet passage (36) extends between the container and the blade support member such that steam can exit the container through the opening (14).

25 Claims, 4 Drawing Sheets

APPARATUS FOR STEAMING AND BLENDING FOOD PRODUCTS

FIELD OF THE INVENTION

The present invention relates to an apparatus for steaming and blending food products. In particular, the apparatus is for producing baby food by steaming and blending food products.

BACKGROUND OF THE INVENTION

Baby food is generally known to be made by steaming food products, and then placing them in a separate blender. This requires two separate appliances.

It is also known to use a single appliance to both steam and blend food products, for example from US 2004/0146621. This document provides a combined steamer and blender. The steam exits the steaming chamber through apertures in the walls of the chamber. This may result in a poor and uneven steaming performance.

US 2008/0047439 describes that during steaming, steam is condensed and collected, but a steam outlet to allow escape of steam from the steaming chamber is not provided.

SUMMARY OF THE INVENTION

The present invention provides, in a first aspect, an apparatus for steaming and blending food products according to claim 1.

The present invention provides, in a second aspect, a system for steaming and blending food products according to claim 12.

Thus, a steam outlet is provided in a location which provides for good steaming performance.

BRIEF DESCRIPTION OF THE DRAWINGS

The present invention will now be described, by way of example only, with reference to the following drawings, in which.

DETAILED DESCRIPTION OF THE EMBODIMENTS

Figure 1:
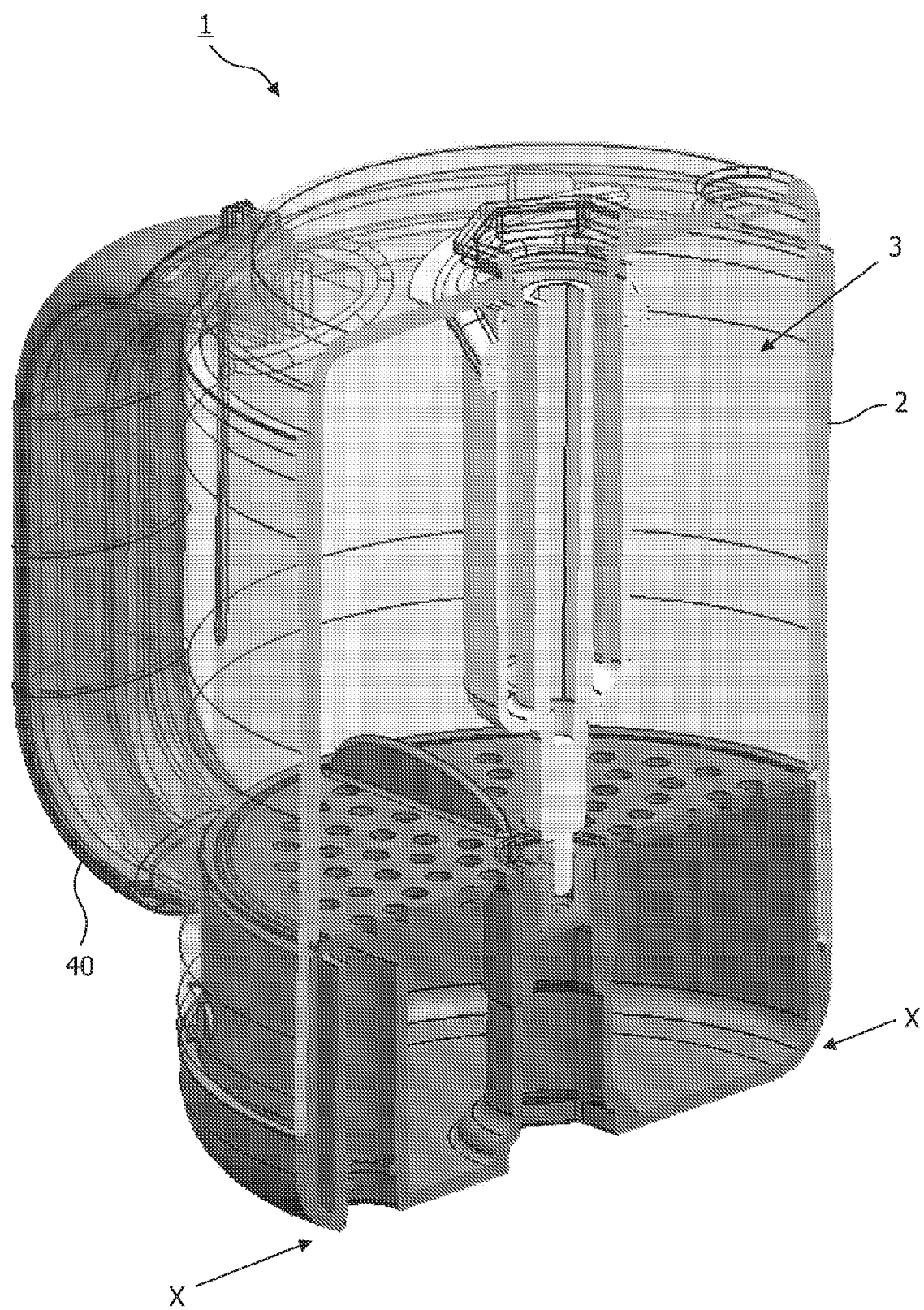
FIG. 1 is a cutaway perspective view of an apparatus for steaming and blending according to the present invention.
Figure 2:
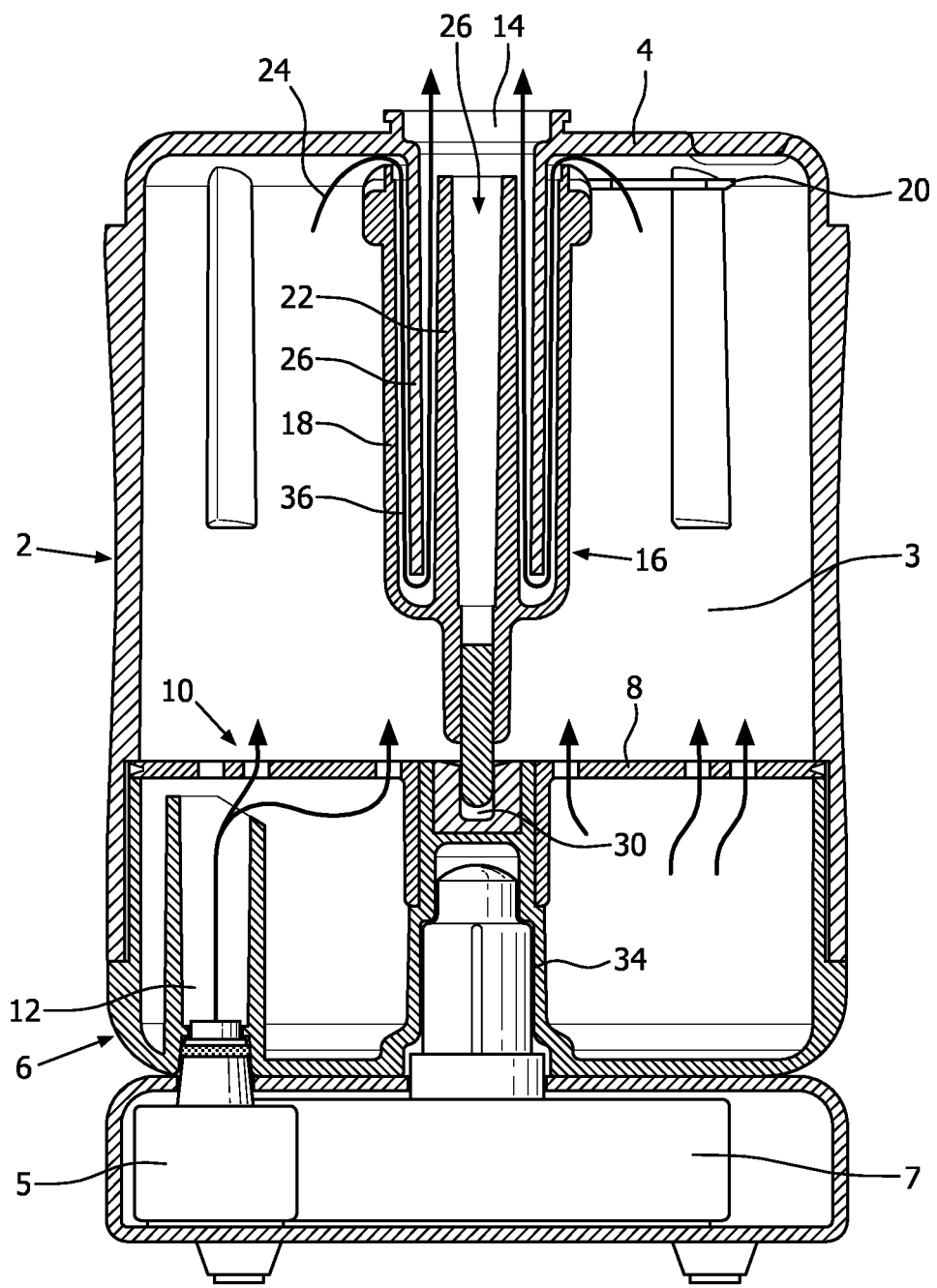
FIG. 2 is a cross-section through the apparatus of FIG. 1 along the line X-X.
Figure 3:
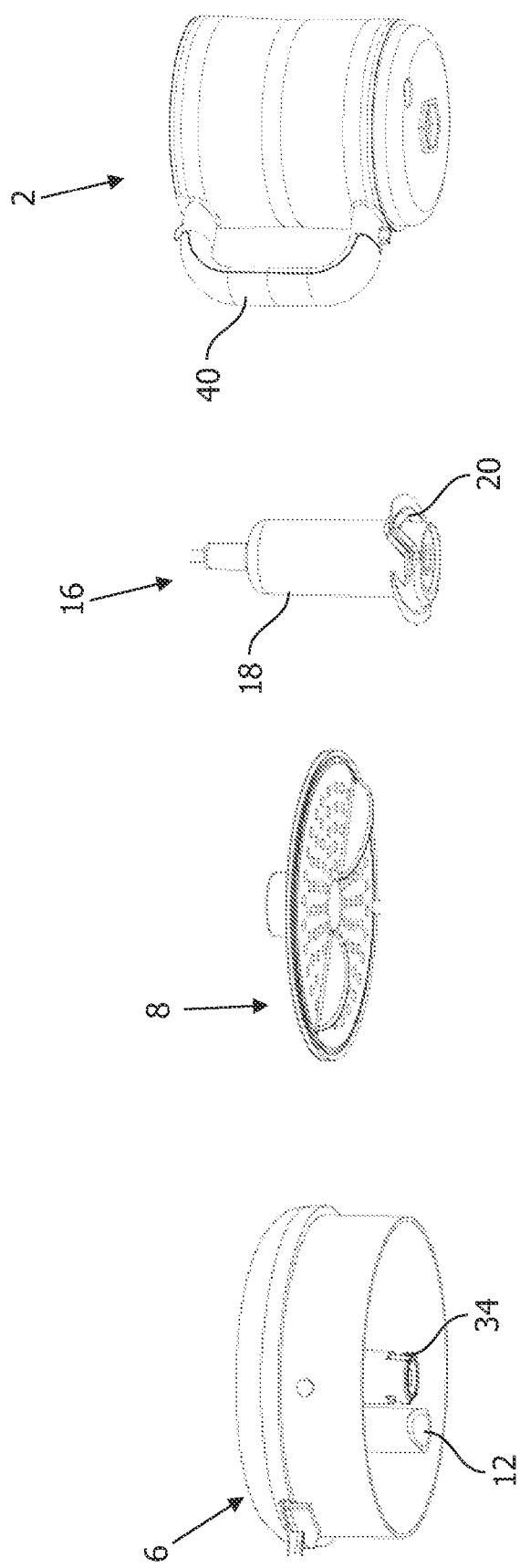
FIG. 3 is an exploded view of the separate parts of the apparatus of FIG. 1.

With reference to FIGS. 1 to 3, an apparatus 1 for steaming and blending food products is provided. The apparatus 1 is able to cook raw food products by steaming. The cooked food products can then be blended into a consistency suitable to be fed to a baby.

The apparatus 1 comprises a container 2 which defines a chamber 3 for receiving food products. A lid 6 fits onto the container 2, which has a handle 40. A sieve 8 is located between the container 2 and lid 6. The sieve 8 has a plurality of apertures 10 through which steam can pass forming a steam inlet, and forms a base of the chamber 3 during steaming. The lid 6 is provided with a steam inlet port 12, through which steam can enter the apparatus 1 from a base unit 9 having a steam generator 5. Steam can exit the container through a steam outlet passage 36, which will be described in more detail below.

FIGS. 1 and 2 show the apparatus 1 orientated to steam food products. In order to blend food products, the apparatus 1 is turned 180° so that the lid 6 is on top of the container 2. The food products may be one or more items of foodstuff of one or more types.

A blade assembly 16 is directly driven by a rotating driving member 7 attached to the base unit 9, in order to blend food products. The blade assembly 16 comprises a blade outer support member 18, a blade inner support member 22 and at least one knife or blade 20. The outer support member 18 and inner support member 22 are annular spaced apart concentric walls, and are driven to rotate with the blade(s) 20 by the driving member 7. The blade assembly 16 has an end 28 distal from the base 4, which is engaged in a blind bore 30 of the lid 6 for support.

The lid is provided with a recess 34 to receive the driving member 7 of the base unit 9. The driving member 7 is not used to rotate the lid 6, but ensures the apparatus 1 is correctly located and stably positioned on the base unit 9.

The container 2 has an opening 14, over which the blade assembly 16 is located. The container comprises an annular upstanding wall 26 which extends from the base 4 of the container 2 and surrounds the opening 14. The wall 26 extends between the outer and inner support members 18, 22. The opening 14 can be considered as defined at any point along the upstanding wall 26. The upstanding wall 26 of the container ensures that, when blending, food products cannot fall through the opening 14.

The blade assembly 16 is driven through the opening 14 in the container 2, the opening 14 facing downwardly when the apparatus 1 is used for blending. The driving member 7 is engagable with an interior surface of the inner support member 22 when located in bore 38. The blade assembly 16 is supported by the driving member 7. A drive through assembly in the container is therefore not required, which reduces complexity and cost.

The outer support member 18 extends to adjacent the base 4 of the container 2, and defines a first steam outlet port 24 with the base 4. Steam can exit the chamber 3 through the first steam outlet port 24. The outer support member 18 is spaced apart from an exterior surface of the wall 26, to form a section of steam outlet passage 36. The inner support member 22 is spaced apart from an inner surface of the wall 26, forming a further section of steam outlet passage 36.

The steam outlet passage 36 has at least one change of direction. Steam passing through the steam outlet passage 36 undergoes a first change of direction of between 90 and 180 degrees when passing through the first port 24, and passing over the end surface of the outer support member 18. The steam outlet passage 36 further has a 180 degree change of direction around the end surface of the wall of the container at point 32 where the inner and outer support members join. The steam outlet passage 36 can be considered a labyrinth due to the at least one change in direction required (preferably a reversal of direction) as it passes through the steam outlet passage 36.

The steam outlet passage 36 has a second port through which steam exits the container. The second port is preferably at or adjacent to the opening 14 through which the blade assembly is driven, or is in fluid communication with the opening 14. The opening 14 through which the steam exits is relatively large, providing a low steam velocity at exit.

When cooking with steam, the steam has to be distributed evenly through the food for a good result. To achieve this, the entry and exit points should be as far apart as possible. When using a single apparatus which is inverted between steaming and blending modes, either the steam inlet or exit hole are conventionally positioned at the bottom of the container, leading to cooking fluids leaking from the container when the container is flipped in to the blending position. Positioning the hole on the container wall reduces the problem of leakage but results in a poor and uneven steaming performance. The present invention provides a steam exit on the top surface of the container in a central position, which provides for good steaming performance. When blending, the steam exit of the present invention does not leak cooking fluids.

The steam outlet passage 36 is formed using two parts, wall 26 and blade assembly 16. Using two parts improves cleanability compared to one part solutions.

The driving member 7 engages with an interior surface of the inner support member, and so does not affect the steam outlet passage 36 which is formed between the exterior surface of the inner support member 22 and the wall 26. The blade assembly 16 extends at least partially over, i.e. overlapping with in a longitudinal direction (vertical direction as shown), the opening in the container 2 through which steam exits.

Figure 4:
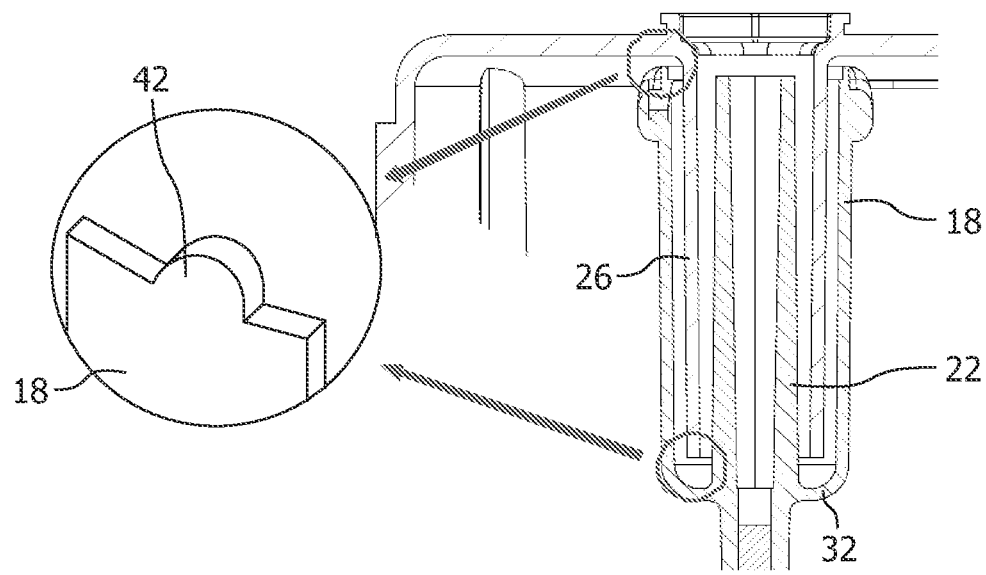
FIG. 4 is an enlarged view of part of the apparatus of FIG. 1.

FIG. 4 shows an enlargement of the blade assembly 16. The outer support member 18 has an end surface partly defining the port 24. The wall 26 has an end surface adjacent point 32. The end surface of the outer support member 18 and/or the wall 26 is configured, with an adjacent surface, to prevent the steam outlet passage 36 being closed off. The surfaces are shaped so that even when abutting an opposing surface, at least one aperture is provided between the surfaces to allow steam to pass through.

Preferably, the end surface or opposing surface has at least one protrusion 42, preferably having rounded edges. The protrusion 42 extends in the plane of the wall 26 or outer support member 18. As the blade assembly 16 is urged upwardly, a protrusion 42 on the outer support member 18 contacts the base 4, allowing steam to enter the steam passage through apertures formed around the protrusion 42. Similarly, a protrusion 42 on the wall 26 may contact the join 32 between the inner and outer support members 18, 22, allowing steam to pass around the protrusion 42. The feature may be of any shape which breaks the smoothness of either the end surfaces past which the steam flows, ensuring that a seal is not formed. The protrusions may alternately be formed on the facing surface of the base 4 and/or joining part 32.

In use, food products are placed in the chamber 3 of the container, and the lid 6 attached to the container 2. The apparatus 1 is placed on the base unit 9, with the lid 6 downwardly.

Steam is generated in the base unit 9 and enters through opening 12, through sieve 8 and into the chamber 3 of the container. The steam heats the food products, and exits the chamber 3 through the steam outlet port 24. The steam travels down and then up along the steam outlet passage 36, and finally is exhausted through opening 14 to the atmosphere.

When the steaming is complete, the apparatus 1 is removed as a whole from the base unit 9 and rotated 180°. The base 4 of the container 2 faces downwardly, and the driving member 7 of the base unit 9 extends through the opening 14 and engages with the blade assembly 16. The blade assembly 16 is driven to rotate. The blade(s) 20 chop and blend the food products until the desired consistency is reached. The lid 6 may then be removed, and the blended food products removed from the container and are ready to serve.

The blade assembly has been described as having an outer support member and an inner support member. Alternatively, the blade assembly may only have an outer support member radially outside of the wall 26 of the container. The steam outlet passage 36 is then defined solely by the interior surface of the wall 26 after passing the end surface of the wall at point 32.

The whole of the blade assembly has been described as rotatably driven. Alternatively, only a part of the blade support member attached to the blade is driven, and a part of the blade support member is stationary. The steam outlet passage 36 may extend through one or both of the rotating and stationary parts.

The invention claimed is:

1. An apparatus for steaming and blending food products, comprising:
    a container for receiving the food products,
    the container having a steam inlet and a steam outlet passage,
    a blade assembly located in the container for blending the food products, the blade assembly comprising a blade support member having at least one blade extending therefrom,
    wherein the blade support member is located over an opening in the container,
    wherein the blade assembly further comprises an inner support member and an outer support member which are annular spaced apart concentric walls that are driven to rotate with the blade, and
    wherein the steam outlet passage extends between the container and the blade support member such that steam can exit the container through the opening.

2. An apparatus as claimed in claim 1 wherein the blade assembly is driven through the opening in the container.

3. An apparatus as claimed in claim 1 wherein the container comprises an upstanding wall around the opening, wherein the blade support member is located around the upstanding wall, and the steam outlet passage extends between the upstanding wall and the support member.

4. An apparatus as claimed in claim 3 wherein the upstanding wall extends between the outer support member and the inner support member, and the steam outlet passage extends between the upstanding wall and the outer support member and further extends between the upstanding wall and the inner support member.

5. An apparatus as claimed in claim 1 wherein the blade assembly is driven to rotate by a driving member extending through the opening in the container and engaging with an interior surface of the inner support member.

6. An apparatus as claimed in claim 1 wherein the apparatus has a first orientation for steaming food products in which the steam inlet is at the bottom of the container and the steam outlet passage is at the top of the container, and a second, inverted, orientation for blending food products in which at least one blade of the blade assembly operates adjacent the bottom of the container.

7. An apparatus as claimed in claim 1 wherein the steam outlet passage is in the form of a labyrinth.

8. An apparatus as claimed in claim 1 wherein the steam outlet passage has a first port defined between the container and the blade assembly through which steam can exit the container, the steam outlet passage having at least one change in direction defined by the container and the blade support member, and a second port through which steam can exit the container.

9. An apparatus as claimed in claim 1 wherein the steam inlet is on an opposite side of the container to the steam outlet passage.

10. An apparatus as claimed in claim 1 wherein the blade assembly and/or the container has at least one end surface around which the steam outlet passage extends, said at least one end surface configured such that, when abutting an adjacent surface, apertures are defined though which steam can pass.

11. An apparatus as claimed in claim 10 wherein the or each end surface is provided with at least one protrusion.

12. A system for steaming and blending food products, comprising:
  an apparatus having:
    a container for receiving the food products, comprising a steam inlet and steam outlet passage, the container further comprising an upstanding wall around an opening in the container, wherein the upstanding wall extends between the outer support member and inner support member,
    a blade assembly located in the container for blending the food products, the blade assembly comprising an inner and outer support member,
  wherein the system further comprises:
    a base unit having a drive member engagable with the blade assembly in the container of the apparatus,
    a steam generator engagable with the apparatus,
  wherein the container is connectable to the base unit in a first orientation in which steam from the steam generator can enter the container,
  wherein the container is connectable to the base unit in a second, inverted, orientation in which the drive member can drive the blade assembly, and
  wherein the steam outlet passage is formed between the container and the blade assembly.

13. A system as claimed in claim 12 wherein the blade assembly is driven by the drive member through an opening in the container, and the steam outlet passage opens into the same opening.

14. A system as claimed in claim 12 wherein the steam outlet passage extends between the upstanding wall and the outer support member and further extends between the upstanding wall and the inner support member.

15. An apparatus for steaming and blending food products, comprising:
  a container for receiving the food products,
  the container having a steam inlet and a steam outlet passage,
  a blade assembly located in the container for blending the food products, the blade assembly comprising a blade support member having at least one blade extending therefrom,
  wherein the blade support member is located over an opening in the container,
  the steam outlet passage extends between the container and the blade support member such that steam can exit the container through the opening
  wherein the apparatus has a first orientation for steaming food products in which the steam inlet is at the bottom of the container and the steam outlet passage is at the top of the container, and a second, inverted, orientation for blending food products in which at least one blade of the blade assembly operates adjacent the bottom of the container.

16. An apparatus as claimed in claim 15 wherein the blade assembly is driven through the opening in the container.

17. An apparatus as claimed in claim 15 wherein the container comprises an upstanding wall around the opening, wherein the blade support member is located around the upstanding wall, and the steam outlet passage extends between the upstanding wall and the support member.

18. An apparatus as claimed in claim 15 wherein the blade assembly comprises an outer support member and an inner support member, wherein the upstanding wall extends between the outer support member and the inner support member, and the steam outlet passage extends between the upstanding wall and the outer support member and further extends between the upstanding wall and the inner support member.

19. An apparatus as claimed in claim 18 wherein the blade assembly is driven to rotate by a driving member extending through the opening in the container and engaging with an interior surface of the inner support member.

20. An apparatus as claimed in claim 18 wherein the inner support member and outer support member are annular spaced apart concentric walls that are driven to rotate with the blade assembly.

21. An apparatus as claimed in claim 15 wherein the steam outlet passage is in the form of a labyrinth.

22. An apparatus as claimed in claim 15 wherein the steam outlet passage has a first port defined between the container and the blade assembly through which steam can exit the container, the steam outlet passage having at least one change in direction defined by the container and the blade support member, and a second port through which steam can exit the container.

23. An apparatus as claimed in claim 15 wherein the steam inlet is on an opposite side of the container to the steam outlet passage.

24. An apparatus as claimed in claim 15 wherein the blade assembly and/or the container has at least one end surface around which the steam outlet passage extends, said at least one end surface configured such that, when abutting an adjacent surface, apertures are defined though which steam can pass.

25. An apparatus as claimed in claim 24 wherein the or each end surface is provided with at least one protrusion.

* * * * *